Jan. 22, 1946.  O. W. HEINZ  2,393,533
WATER GOGGLES
Filed July 20, 1943
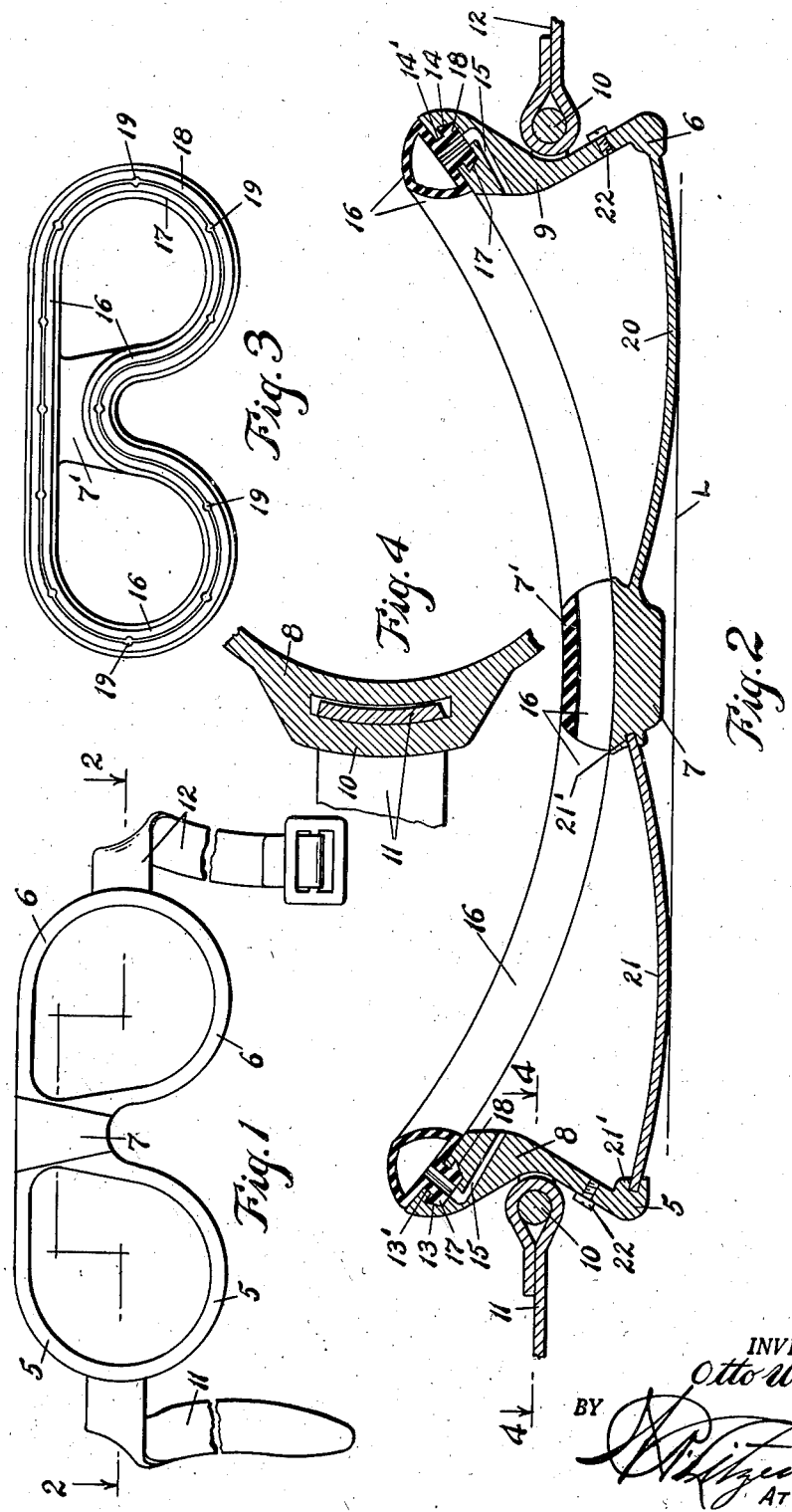
INVENTOR.
Otto W. Heinz
BY
ATTY.

Patented Jan. 22, 1946

2,393,533

UNITED STATES PATENT OFFICE 2,393,533

WATER GOGGLES

Otto W. Heinz, Los Angeles, Calif.

Application July 20, 1943, Serial No. 495,441

2 Claims. (Cl. 2—14)

This invention relates to water goggles, and more especially to water goggles designed for use under water, that is: for underwater fishing, underwater inspection and repair of boats, and for all uses where water tight and air tight fit must be had for the protection of the eyes and where good view under water is necessary.

It will be obvious that a goggle which is suitable for such purposes will also be well suited for use as sun and wind and dust goggles, and in fact for all uses for which goggles are ever used.

Among the salient objects of the invention are: to provide such a goggle which is light and sufficiently strong and durable for all of the many uses to which it may be put, and to provide such a goggle at relatively low cost.

Attempts have been made to provide water goggles for the purposes mentioned, but in most cases they are heavy, cumbersome and uncomfortable for the wearer.

Another objection which has been present in most water goggles is that when they are pressed upon the face with any kind of intermediate pad, the air therein is forced out to a certain extent as the parts are compressed against the face, and then when released by the hands there is sufficient outward movement to create a certain vacuum tendency within the goggle and this reacts to cause the eye balls to be sucked outwardly to such an extent as to be uncomfortable, disagreeable and even dangerous to the eyes. I have provided a practical and efficient means for preventing this and for equalizing the pressure within and without the goggle. This vacuum tendency also tends to draw in water into the goggle when used under water, but when the air within the goggle is equalized in pressure to the outside air, then the water is prevented from entering the goggle.

Another objection to water goggles of the known kinds is that the lenses for the eyes are positioned at slight angles to each other and when under water, this causes double vision or double objects to be seen through the reflection.

I have overcome this by constructing my goggles with the lenses or lens portions in the same plane, that is, the portions of the lenses through which the eyes look are in the same plane to overcome the double reflection tendency.

Another very important object of my invention is the construction of goggles out of material whereby the body and the lenses are formed of the same material and made integral, thus making for great economy and efficiency for many uses.

Many other uses and objects will appear from the following description of one practical embodiment of my invention, taken in connection with the accompanying sheet of drawings, which I will now describe.

Figure 1 is a front or face view of goggles embodying my invention;

Figure 2 is a greatly enlarged sectional view thereof taken on the irregular line 2—2 of Fig. 1;

Figure 3 is an inner view or elevation of an intermediate pneumatic pad detached and which is attached to the inner side of the goggle body, in a channel formed to receive it; and Figure 4 is an enlarged sectional view as it would look taken at the position of line 4—4 of Fig. 2.

The body of my new goggle will be made or moulded of material which will give it form, strength and beauty, preferably of a plastic such as the "acrylic resin products," which include Lucite, Plexiglas, Rhoplex and Crystalite, and others, or materials of the cellulose acetate group. When the body is formed of such material as Lucite, for example, or its equivalent, which is transparent, I have conceived the idea of making the body of the goggle and the lenses thereof all of the same material and made integral with the body, thus making it possible to mould or form such goggles in one piece and with all of the advantages hereinbefore pointed out.

Referring now more in detail to the drawing, the goggle body will be formed or moulded with the front frame or rim portions 5 and 6, connected with a nose or bridge portion 7, designed to fit over the nose of the wearer and to give strength and rigidity to the frame portions, and rearwardly from said frame and rim portions are formed the body portions 8 and 9, which conform to the curvature of the upper part of the face in the usual manner. These portions 8 and 9 are seen in section in Fig. 2, extending from the front frame or rim portions 5 and 6, and giving body and strength to the goggle.

I have shown formed on these portions of the goggle, on the outer sides thereof, a fastening or holding bar portion 10, to which a holding strap 11—12 can be attached, substantially in the manner indicated in Figs. 1, 2 and 4.

The body part of the goggle will be so formed and shaped that it will fit the average face and then with a rubber or other flexible pad, to be described, interposed between the body of the goggle and the face, it will fit with water tight condition.

Referring now to the sectional view, Fig. 2, the outer tapering portion of the body portions 8 and 9, are provided with channels 13 and 14 therein, having restricted openings, as 13' and 14', and also having at intervals small vent openings, as 15, through the body to the inside of the goggle, as clearly indicated in Fig. 2.

A specially formed rubber pad 16 is shown, of the form of the goggle, as seen in Fig. 3, which is a view of the inner side which fits into the channels 13—14. This pad is shown in section in Fig. 2, and is of tubular form, with flange-like portions, 17—18, along the meeting edges of the body of this pad. This makes possible a water tight fit between the pad and the body of the goggle. At intervals said pad edges are provided with enlargements, as 19, 19, positioned to register with the air vents 15, 15; in the channels 13—14 leading to the inside of the body of the goggle, as shown in Fig. 2. This construction and arrangement makes possible the equalizing of the air pressure inside of the goggle and the outside air, and eliminates any tendency of vacuum within the goggle.

Said pad conforms to the body of the goggle, with the bridge or connecting portion, designated 7', to correspond with the part 7, of the goggle.

I have also shown small vent openings, with small closure elements to be inserted therein, as at 22, 22, when desired, so that these closure elements can be removed to permit equalizing of the air within and without the goggle when worn as sun or beach goggles.

As stated, an important feature of my invention is the idea of forming the body of the goggle and the lens portions out of the same material and integral. This I have illustrated in the right hand lens portion 20, which is shown formed integrally with the rim portion 6 and the bridge portion 7. The other lens 21 is shown as inset, as at 21', in the body of the rim portion. I have shown both methods on the same sectional view in order to avoid unnecessary drawings. This is believed to be a new feature and it is an important feature, for it is not believed that goggles or eye protectors of the character shown have been before formed of transparent material and with the lens portions made integral with the body thereof.

Another important feature of the invention is the positioning of the lenses, or lens portions, of my goggle in the same plane, whereby when used under water to avoid duplicating reflections caused when the lenses are at a slight angle to each other. In Fig. 2, it will be seen that the eye portions of the lens and lens portion, are in the same plane, as indicated by the line L.

It should be stated also that the material used can be of any desired tint or color, and that the lens portions can also be of suitable tint or smoked effect, as may be desired for the eyes of the wearer.

I am aware that changes in the details of construction and arrangement can be made in the embodiments shown in the drawing and as described without departing from the spirit of my invention, and I do not, therefore, limit the invention to these details shown for explanatory purposes, except as I may be limited by a broad and fair construction of the claims herewith submitted and forming a part of this specification.

I claim:

1. A pair of water goggles having body, lens, and face-fitting form portions all moulded of the same material, the lens portion being transparent, a face-fitting air containing pad with means holding it around the face-fitting form portions of said body; vents through the opposite ends of said body connecting the air containing pad with the inside of the body; inside the lens portions, said body also having vents with closure means therefor for opening the inside of the body to the outside atmosphere.

2. A pair of water goggles having body and face-fitting form portions all moulded of the same material, with lens seated therein; a face-fitting air containing pad with means holding it around the face-fitting form portions of said body, vents through the opposite ends of said body connecting the air containing pad with the inside of the body, inside the lens, said body also having vents with closure means therefor for opening the inside of the body to the outside atmosphere.

OTTO W. HEINZ.